(12) United States Patent
Guo et al.

(10) Patent No.: US 11,518,214 B2
(45) Date of Patent: Dec. 6, 2022

(54) AIR CONDITIONER CONTROL METHOD AND SYSTEM, STORAGE MEDIUM AND PROCESSOR

(71) Applicant: Gree Electric Appliances, Inc. of Zhuhai, Guangdong (CN)

(72) Inventors: Aibin Guo, Guangdong (CN); Lei Han, Guangdong (CN); Huaying Chen, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 46 days.

(21) Appl. No.: 17/049,285

(22) PCT Filed: Jan. 30, 2019

(86) PCT No.: PCT/CN2019/073985
§ 371 (c)(1),
(2) Date: Oct. 20, 2020

(87) PCT Pub. No.: WO2020/037953
PCT Pub. Date: Feb. 27, 2020

(65) Prior Publication Data
US 2021/0237536 A1 Aug. 5, 2021

(30) Foreign Application Priority Data
Aug. 20, 2018 (CN) .......................... 201810949965.3

(51) Int. Cl.
*B60H 1/00* (2006.01)

(52) U.S. Cl.
CPC ..... *B60H 1/00807* (2013.01); *B60H 1/00764* (2013.01); *B60H 1/00878* (2013.01); *B60H 2001/00961* (2019.05)

(58) Field of Classification Search
CPC ............ B60H 1/00807; B60H 1/00764; B60H 1/00878; B60H 2001/00961; B60H 1/00735; B60H 1/00899; B60H 1/00814
See application file for complete search history.

(56) References Cited

U.S. PATENT DOCUMENTS

| | | | | |
|---|---|---|---|---|
| 2014/0100716 A1* | 4/2014 | Kawai | ..................... | B60L 53/14 701/2 |
| 2014/0345312 A1* | 11/2014 | Katoh | ..................... | F25B 47/00 62/277 |
| 2015/0246594 A1* | 9/2015 | Endoh | .................... | B60H 1/321 62/140 |

FOREIGN PATENT DOCUMENTS

| CN | 108068577 A | 5/2018 |
|---|---|---|
| CN | 108146185 A | 6/2018 |

(Continued)

OTHER PUBLICATIONS

International Search Report, dated Mar. 28, 2019, in International application No. PCT/CN2019/073985, filed on Jan. 30, 2019.

*Primary Examiner* — Marc E Norman
*Assistant Examiner* — Matthew John Moscola
(74) *Attorney, Agent, or Firm* — McAndrews, Held & Malloy, Ltd.

(57) ABSTRACT

The present disclosure discloses an air conditioner control method and system, a non-transitory storage medium and a processor. The control system includes an environmental temperature sensor configured to detect a first temperature value of an external environment of a target object; a heat exchanger temperature sensor configured to detect a second temperature value of an outside heat exchanger of an air conditioner system; a speed monitoring system configured to detect a driving speed of the target object; and a control system, connected to the environmental temperature sensor, the heat exchanger temperature sensor and the speed moni- (Continued)

toring system, and configured to determine according to the first temperature value, the second temperature value and the driving speed, whether the air conditioner system enters a defrosting mode in a case that the air conditioner system operates in a heating mode.

20 Claims, 4 Drawing Sheets

(56) References Cited

FOREIGN PATENT DOCUMENTS

| | | |
|---|---|---|
| CN | 109109613 A | 1/2019 |
| JP | 2013241097 A | 12/2013 |
| KR | 20140098890 A | 8/2014 |
| WO | 2014115509 A1 | 7/2014 |

* cited by examiner

AIR CONDITIONER CONTROL METHOD AND SYSTEM, STORAGE MEDIUM AND PROCESSOR

CROSS REFERENCE TO RELATED APPLICATIONS

This application is a 371 of International Patent Application No. PCT/CN2019/073985, filed Jan. 30, 2019, which claims priority to Chinese Application No. 201810949965.3, filed on Aug. 20, 2018, entitled "Air conditioner control method and system, storage medium and processor", which are specifically and entirely incorporated by reference.

TECHNICAL FIELD

The present disclosure relates to the field of air conditioner control, and in particular to an air conditioner control method and system, a non-transitory storage medium and a processor.

BACKGROUND

With the development of battery electric vehicles, heat pump air conditioners have been gradually applied to the battery electric vehicles at present. The heat pump air conditioner system of the battery electric vehicles has a different service environment from a household air conditioner. The household heat pump air conditioner is located in a fixed installation state. While entering a defrosting mode, the surface of an outside heat exchanger is located in a windless state by controlling an external fan to stop. However, the outside heat exchanger of a vehicle air conditioner is generally located at the front end of an automobile, thus a higher air velocity is formed on the surface of the outside heat exchanger of the automobile that drives at a high speed. After the heat pump car air conditioner enters the defrosting mode, lots of heat for defrosting will be taken away by air flowing at a high speed on the surface of the outside heat exchanger.

FIG. 1 is a schematic diagram illustrating a defrosting effect of the heat pump car air conditioner at different environmental temperatures and speeds obtained according to an experiment. In an upper area of a curve A, defrosting conditions are bad, defrosting heat is seriously lost, defrosting efficiency is low, and incomplete defrosting may occur on the outside heat exchanger of the heat pump car air conditioner system. In a lower area of the curve A, the defrosting conditions are relatively good, the defrosting efficiency is increased, and the outside heat exchanger of the heat pump car air conditioner system may be completely defrosted. If a control method of a conventional heat pump air conditioner defrosting mode is adopted, the heat pump car air conditioner system will enter the defrosting mode in the upper area of the curve A. Therefore, the incomplete defrosting is caused; the heat is wasted; power consumption of the electric vehicles is increased; and a defrosting cycle is long, thereby seriously affecting comfort of passengers.

In addition, when the vehicle is in bad conditions that the driving speed is high and a temperature of a vehicle outside environment is low for a long time, phenomena that the outside heat exchanger has repeated incomplete defrosting and frost is increasingly thick are easily caused, thereby affecting the normal operation of an air conditioner heating mode and reliability of the air-conditioning unit.

With respect to the above problems, no effective solution has been proposed so far.

SUMMARY

According to one aspect of embodiments of the present disclosure, an air conditioner control system is provided. The control system includes an environmental temperature sensor configured to detect a first temperature value of an external environment of a target object; a heat exchanger temperature sensor configured to detect a second temperature value of an outside heat exchanger of an air conditioner system; a speed monitoring system configured to detect a driving speed of the target object; and a control system, connected to the environmental temperature sensor, the heat exchanger temperature sensor and the speed monitoring system, configured to determine according to the first temperature value, the second temperature value and the driving speed, whether the air conditioner system enters a defrosting mode in a cast that the air conditioner system operates in a heating mode.

According to another aspect of embodiments of the present disclosure, an air conditioner control method is provided. The control method includes the following steps: a first temperature value of an external environment of a target object, a second temperature value of an outside heat exchanger of an air conditioner system and a driving speed of the target object is acquired; and whether the air conditioner system enters a defrosting mode is determined according to the first temperature value, the second temperature value and the driving speed in a case that the air conditioner system operates in a heating mode.

According to another aspect of embodiments of the present disclosure, a non-transitory storage medium is provided. The storage medium includes stored programs, wherein the above air conditioner control method is executed by the programs.

According to another aspect of embodiments of the present disclosure, a processor is provided. The processor is used for running programs. The above air conditioner control method is executed during program running.

BRIEF DESCRIPTION OF THE DRAWINGS

For a better understanding of the present disclosure, accompanying drawings described hereinafter are provided to constitute one part of the disclosure; the schematic embodiments of the present disclosure and the description thereof are used to illustrate the present disclosure but to limit the present disclosure improperly. In the accompanying drawings.

DETAILED DESCRIPTION OF THE EMBODIMENTS

To well understand solutions of the present disclosure by those skilled in the art, the technical solutions in the embodiments of the present disclosure will be clearly and fully described below in combination with drawings in the embodiments of the present disclosure. Apparently, the described embodiments are merely part of the embodiments of the present disclosure, not all of the embodiments. Based on the embodiments in the present disclosure, all other embodiments obtained by those ordinary skilled in the art without contributing creative labor will belong to the protection scope of the present disclosure.

It should be understood that, the description and claims of the present disclosure and terms "first", "second" and the like in the above drawings are used for distinguishing similar objects, rather than describing specific sequences or precedence orders. It should be understood that, the used data may be exchanged where appropriate, thus the embodiments of the present disclosure described herein can be implemented in sequence except for those sequences illustrated or described herein. In addition, terms "comprise", "include" or any other variant are intended to cover non-exclusive inclusion. For example, the processes, methods, systems, products or equipment including a series of steps or units need not be limited to clearly listed steps or units, but may include other steps or units inherent to these processes, methods, products or equipment that are not clearly listed.

Embodiment 1

Figure 2:
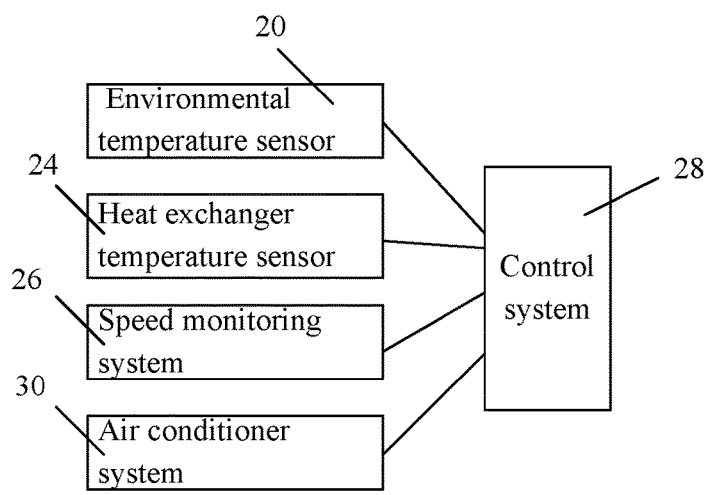
FIG. 2 is a structural schematic diagram illustrating an optional air conditioner control system according to the embodiments of the present disclosure.

According to embodiments of the present disclosure, some embodiments of an air conditioner control system are provided. FIG. 2 illustrates an air conditioner control system according to the embodiments of the present disclosure. As shown in FIG. 2, the air conditioner control system includes:

an environmental temperature sensor 20, configured to detect a first temperature value of an external environment of a target object; a heat exchanger temperature sensor 24, configured to detect a second temperature value of an outside heat exchanger of an air conditioner system 30; a speed monitoring system 26, configured to detect a driving speed of the target object; and a control system 28, connected to the environmental temperature sensor 20, the heat exchanger temperature sensor 24 and the speed monitoring system 26, configured to determine according to the first temperature value, the second temperature value and the driving speed, whether the air conditioner system enters a defrosting mode in a case that the air conditioner system 30 operates in a heating mode.

In some embodiments, the target object is an automobile; and the air conditioner system is a heat pump air conditioner system.

Optionally, the heat exchanger temperature sensor 24 is arranged between fins of the outside heat exchanger, or arranged on an inlet-outlet tube of the outside heat exchanger, or arranged on a surface of the outside heat exchanger.

Optionally, the environmental temperature sensor 20 is arranged at a front end of the target object.

Figure 3A:
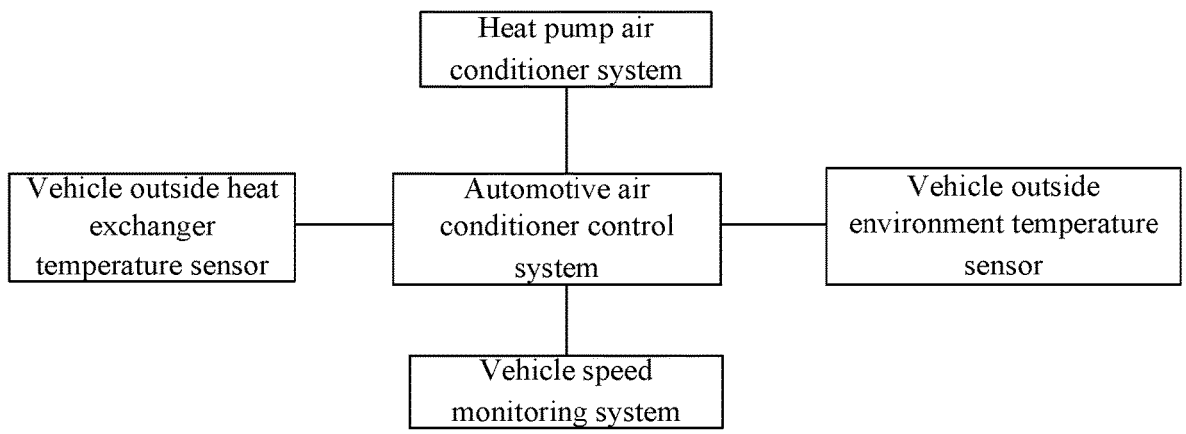
FIG. 3(a) is a structural schematic diagram illustrating an optional air conditioner control system according to the embodiments of the present disclosure.

The air conditioner control system in some embodiments takes an automotive air conditioner control system as an example. As shown in FIG. 3(a), the automotive air conditioner control system includes a heat pump air conditioner system (that is, the above air conditioner system), a vehicle outside environment temperature sensor (that is, the above environmental temperature sensor 20), a vehicle outside heat exchanger temperature sensor (that is, the heat exchanger temperature sensor 24) and a vehicle speed monitoring system (that is, the above speed monitoring system 26).

Figure 3B:
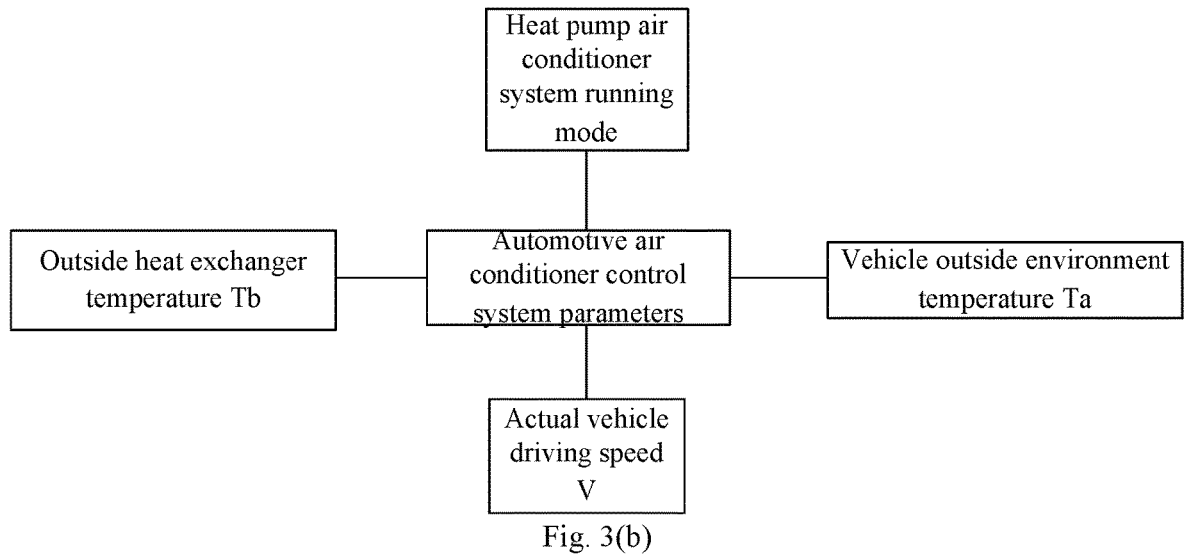
FIG. 3(b) is a schematic diagram illustrating an optional control parameter according to the embodiments of the present disclosure.

In combination with FIG. 3(b), the heat pump air conditioner system can realize a heating mode, a refrigeration mode and a defrosting mode. When the defrosting mode runs, valve switching is generally performed in a case that the heating mode runs, so that a refrigerant circulation direction of the heat pump air conditioner system is changed; high-temperature high-pressure refrigerants discharged from a compressor pass through the outside heat exchanger; the frost on the surface of the outside heat exchanger melts into condensed water and then is discharged; and after defrosting is completed, the valve is switched to a heating mode running state. In some embodiments, the valve is a four-way valve, and may also be any other two-way solenoid valve or three-way solenoid valve, specific type of value is determined depending on an actual heat pump air conditioner system. The running mode of the heat pump air conditioner system is acquired by the automotive air conditioner control system in real time.

The vehicle outside environment temperature sensor is installed at the front end of the vehicle, and is configured to detect a temperature value of the vehicle outside environment. The vehicle outside heat exchanger temperature sensor is generally installed between the fins of the outside heat exchanger or on the inlet-outlet tube or at any other position on the surface of the outside heat exchanger, and the vehicle outside heat exchanger temperature sensor is configured to detect a temperature value of a vehicle outside heat exchanger. The automotive air conditioner control system acquires a vehicle outside environment temperature Ta (that is, the first temperature value) which is detected and an outside heat exchanger temperature Tb (that is, the second temperature value) which is detected in real time.

The vehicle speed monitoring system detects an actual driving speed V of the current vehicle in real time; and the automotive air conditioner control system acquires the detected vehicle speed V (that is, the above driving speed) in real time.

Optionally, the control system includes: a comparator, configured to determine a preset temperature interval to which the first temperature value belongs; a controller, configured to determine that the air conditioner system enters the defrosting mode based on the preset temperature interval to which the first temperature value belongs in a case that the second temperature value and the driving speed meet preset conditions.

Optionally, the preset temperature interval includes a first temperature interval, a second temperature interval and a third temperature interval. A temperature value of the first temperature interval is greater than a temperature value of the second temperature interval; and the temperature value of the second temperature interval is greater than a temperature value of the third temperature interval.

The first temperature interval is an interval greater than or equal to a preset temperature value T1; the second temperature interval is an interval less than the preset temperavalue T1 and greater than or equal to a preset temperature value T2; and the third temperature interval is an interval less than the preset temperature value T2.

In some embodiments of the first case, in a case that the first temperature value belongs to the first temperature interval, the comparator is further configured to determine whether a temperature difference of the first temperature value and the second temperature value is greater than or equal to a first preset temperature; and the controller is configured to determine that the air conditioner system enters a defrosting mode if the temperature difference of the first temperature value and the second temperature value is greater than or equal to the first preset temperature.

In some embodiments of the second case, in a case that the first temperature value belongs to the second temperature interval, the comparator is further configured to determine whether the driving speed is less than a second speed threshold and whether a temperature difference of the first temperature value and the second temperature value is greater than or equal to a second preset temperature; and the controller is configured to determine that the air conditioner system enters the defrosting mode if the driving speed is less than the second speed threshold and the temperature difference of the first temperature value and the second temperature value is greater than or equal to the second preset temperature.

In some embodiments of the third case, in a case that the first temperature value belongs to the third temperature interval, the comparator is further configured to determine whether the driving speed is less than a third speed threshold and whether a temperature difference of the first temperature value and the second temperature value is greater than or equal to a third preset temperature; and the controller is configured to determine that the air conditioner system enters the defrosting mode if the driving speed is less than the third speed threshold and the temperature difference of the first temperature value and the second temperature value is greater than or equal to the third preset temperature.

In some embodiments of the fourth case, in a case that the first temperature value belongs to the first temperature interval, the comparator is further configured to determine whether the driving speed is greater than or equal to a first speed threshold. The control system further includes: a timer, configured to determine whether a duration in which the driving speed is greater than or equal to the first speed threshold reaches a first time threshold; a comparator, configured to determine whether a temperature difference of the first temperature value and the second temperature value is greater than or equal to a difference of the first temperature threshold and a first corrected value if the driving speed is greater than or equal to the first speed threshold and the duration reaches the first time threshold; and a controller, configured to determine that the air conditioner system enters the defrosting mode if the temperature difference of the first temperature value and the second temperature value is greater than or equal to the difference of the first temperature threshold and the first corrected value.

Optionally, the comparator is further configured to determine whether the temperature difference of the first temperature value and the second temperature value is greater than or equal to the first temperature threshold if the driving speed is less than the first speed threshold or the duration does not reach the first time threshold; and the controller is configured to determine that the air conditioner system enters the defrosting mode if the temperature difference of the first temperature value and the second temperature value is greater than or equal to the first temperature threshold.

In some embodiments of the fifth case, in a case that the first temperature value belongs to the second temperature interval, the comparator is further configured to determine whether the driving speed is greater than or equal to a second speed threshold. The control system further includes: a timer, configured to determine whether a duration in which the driving speed is greater than or equal to the second speed threshold reaches a second time threshold; a comparator, configured to determine whether a temperature difference of the first temperature value and the second temperature value is greater than or equal to a difference of a second temperature threshold and a second corrected value if the driving speed is greater than or equal to the second speed threshold and the duration reaches the second time threshold; and a controller, configured to determine that the air conditioner system enters the defrosting mode if the temperature difference of the first temperature value and the second temperature value is greater than or equal to a difference of a second temperature threshold and a second corrected value.

Optionally, the comparator is further configured to determine whether the temperature difference of the first temperature value and the second temperature value is greater than or equal to the second temperature threshold if the driving speed is less than the second speed threshold or the duration does not reach the second time threshold; and the controller is configured to determine that the air conditioner system enters the defrosting mode if the temperature difference of the first temperature value and the second temperature value is greater than or equal to the second temperature threshold.

In some embodiments of the fifth case, in a case that the first temperature value belongs to the third temperature interval, the comparator is further configured to determine whether the driving speed is greater than or equal to a third speed threshold. The control system further includes: a timer, configured to determine whether a duration in which the driving speed is greater than or equal to the third speed threshold reaches a third time threshold; a comparator, configured to determine whether a temperature difference of the first temperature value and the second temperature value is greater than or equal to a difference of a third temperature threshold and a third corrected value if the driving speed is greater than or equal to the third speed threshold and the duration reaches the third time threshold; and a controller, configured to determine that the air conditioner system enters the defrosting mode if the temperature difference of the first temperature value and the second temperature value is greater than or equal to the difference of the third temperature threshold and the third corrected value.

Optionally, the comparator is further configured to determine whether the temperature difference of the first temperature value and the second temperature value is greater than or equal to the third temperature threshold if the driving speed is less than the third speed threshold or the duration does not reach the third time threshold; and the controller is configured to determine that the air conditioner system enters the defrosting mode if the temperature difference of the first temperature value and the second temperature value is greater than or equal to the third temperature threshold.

In some embodiments, the first temperature value of the external environment of the target object, the second temperature value of the outside heat exchanger of the air conditioner system and the driving speed of the target object is acquired, and whether the air conditioner system enters the defrosting mode are determined according to the first temperature value, the second temperature value and the driving speed, the heat pump air conditioner system is controlled by integrated utilization of an actual driving speed, the environmental temperature and the temperature of the outside heat exchanger, and aims of ensuring complete defrosting and shortening the defrosting cycle are achieved, thereby achieving technical effects of increasing the defrosting efficiency, increasing comfort of the passengers, decreasing heat waste and lowering entire power consumption of the vehicle, and further solving the problem of incomplete defrosting due to changes in the environmental temperature or the driving speed while using the conventional defrosting mode control method.

Embodiment 2

According to embodiments of the present disclosure, method embodiments of an air conditioner control method are provided. It should be indicated that, steps illustrated in flow diagrams of the drawings may be executed in a computer system including a series of computer executable instructions. Moreover, although a logical order is illustrated in the flow diagram, the illustrated or described steps may be executed in an order different from that described herein in some cases.

Figure 4:
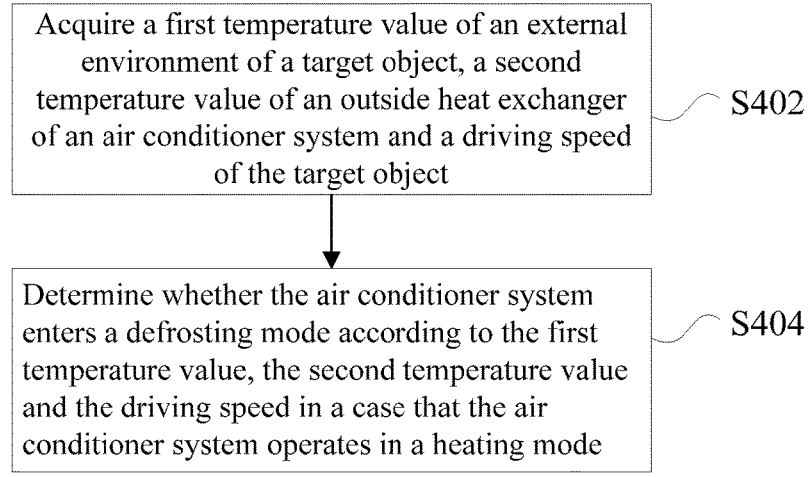
FIG. 4 is a flow diagram illustrating an optional air conditioner control method according to the embodiments of the present disclosure.

FIG. 4 is an air conditioner control method according to the embodiments of the present disclosure. As shown in FIG. 4, the method includes the following steps:

S402: a first temperature value of an external environment of a target object, a second temperature value of an outside heat exchanger of an air conditioner system and a driving speed of the target object is acquired;

in the above S402, the first temperature value is detected by an environmental temperature sensor; the second temperature value is be detected by a heat exchanger temperature sensor; the driving speed is detected by a speed monitoring system; the heat exchanger temperature sensor is arranged between fins of an outside heat exchanger, or arranged on an inlet-outlet tube of the outside heat exchanger, or arranged on the surface of the outside heat exchanger; and the environmental temperature sensor is arranged at the front end of the target object; and S404: whether the air conditioner system enters a defrosting mode is determined according to the first temperature value, the second temperature value and the driving speed in a case that the air conditioner system operates in a heating mode.

Optionally, the operation that whether the air conditioner system enters the defrosting mode is determined according to the first temperature value, the second temperature value and the driving speed includes: a preset temperature interval to which the first temperature value belongs is determined; and the air conditioner system is controlled to enter the defrosting mode based on the preset temperature interval to which the first temperature value belongs in a case that the second temperature value and the driving speed meet preset conditions.

The preset temperature interval includes a first temperature interval, a second temperature interval and a third temperature interval. A temperature value of the first temperature interval is greater than a temperature value of the second temperature interval; and the temperature value of the second temperature interval is greater than a temperature value of the third temperature interval.

In some embodiments of the first case, based on the preset temperature interval to which the first temperature value belongs, in a case that the second temperature value and the driving speed meet preset conditions, the operation that the air conditioner system is controlled to enter the defrosting mode includes: in a case that the first temperature value belongs to the first temperature interval, whether a temperature difference of the first temperature value and the second temperature value is greater than or equal to the first preset temperature is determined; and the air conditioner system is controlled to enter the defrosting mode if the temperature difference is greater than or equal to the first preset temperature.

In some embodiments of the second case, based on the preset temperature interval to which the first temperature value belongs, in a case that the second temperature value and the driving speed meet preset conditions, the operation that the air conditioner system is controlled to enter the defrosting mode includes: in a case that the first temperature value belongs to the second temperature interval, whether the driving speed is less than a second speed threshold and whether a temperature difference of the first temperature value and the second temperature value is greater than or equal to a second preset temperature are determined; and the air conditioner system is controlled to enter the defrosting mode if the driving speed is less than the second speed threshold and the temperature difference of the first temperature value and the second temperature value is greater than or equal to the second preset temperature.

In some embodiments of the third case, based on the preset temperature interval to which the first temperature value belongs, in a case that the second temperature value and the driving speed meet preset conditions, the operation that the air conditioner system is controlled to enter the defrosting mode includes: in a case that the first temperature value belongs to the third temperature interval, whether the driving speed is less than a third speed threshold and whether a temperature difference of the first temperature value and the second temperature value is greater than or equal to a third preset temperature are determined; and the air conditioner system is controlled to enter the defrosting mode if the driving speed is less than the third speed threshold and the temperature difference of the first temperature value and the second temperature value is greater than or equal to the third preset temperature.

In some embodiments of the fourth case, based on the preset temperature interval to which the first temperature value belongs, in a case that the second temperature value and the driving speed meet preset conditions, the operation that the air conditioner system is controlled to enter the defrosting mode includes: in a case that the first temperature value belongs to the first temperature interval, whether the driving speed is greater than or equal to the first speed threshold is determined; whether a duration in which the driving speed is greater than or equal to the first speed threshold reaches a first time threshold is determined; whether a temperature difference of the first temperature value and the second temperature value is greater than or equal to a difference of a first temperature threshold and a first corrected value is determined if the driving speed is greater than or equal to the first speed threshold and the duration reaches the first time threshold; and the air conditioner system is controlled to enter the defrosting mode if the temperature difference of the first temperature value and the second temperature value is greater than or equal to the difference of the first temperature threshold and the first corrected value.

Optionally, the method further includes steps: whether the temperature difference of the first temperature value and the second temperature value is greater than or equal to the first temperature threshold is determined if the driving speed is less than the first speed threshold or the duration does not reach the first time threshold; and the air conditioner system is controlled to enter the defrosting mode if the temperature difference of the first temperature value and the second temperature value is greater than or equal to the first temperature threshold.

In some embodiments of the fifth case, based on the preset temperature interval to which the first temperature value belongs, in a case that the second temperature value and the driving speed meet preset conditions, the operation that the air conditioner system is controlled to enter the defrosting mode includes: in a case that the first temperature value belongs to the second temperature interval, whether the driving speed is greater than or equal to a second speed threshold is determined; whether a duration in which the driving speed is greater than or equal to the second speed threshold reaches a second time threshold is determined; whether a temperature difference of the first temperature value and the second temperature value is greater than or equal to a difference of a second temperature threshold and a second corrected value is determined if the driving speed is greater than or equal to the second speed threshold and the duration reaches the second time threshold; and the air conditioner system is controlled to enter the defrosting mode if the temperature difference is greater than or equal to the difference.

Optionally, the method further includes steps: whether the temperature difference of the first temperature value and the second temperature value is greater than or equal to the second temperature threshold is determined if the driving speed is less than the second speed threshold or the duration does not reach the second time threshold; and the air conditioner system is controlled to enter the defrosting mode if the temperature difference of the first temperature value and the second temperature value is greater than or equal to the second temperature threshold.

In some embodiments of the sixth case, based on the preset temperature interval to which the first temperature value belongs, in a case that the second temperature value and the driving speed meet preset conditions, the operation that the air conditioner system is controlled to enter the defrosting mode includes: in a case that the first temperature value belongs to the third temperature interval, whether the driving speed is greater than or equal to a third speed threshold is determined; whether a duration in which the driving speed is greater than or equal to the third speed threshold reaches a third time threshold is determined; whether a temperature difference of the first temperature value and the second temperature value is greater than or equal to a difference of a third temperature threshold and a third corrected value is determined if the driving speed is greater than or equal to the third speed threshold and the duration reaches the third time threshold; and the air conditioner system is controlled to enter the defrosting mode if the temperature difference of the first temperature value and the second temperature value is greater than or equal to the difference of the third temperature threshold and the third corrected value.

Optionally, the method further includes: whether the temperature difference of the first temperature value and the second temperature value is greater than or equal to the third temperature threshold is determined if the driving speed is less than the third speed threshold or the duration does not reach the third time threshold; and the air conditioner system is controlled to enter the defrosting mode if the temperature difference is greater than or equal to the third temperature threshold.

Through the above steps, the heat pump air conditioner system is controlled by integrated utilization of the actual driving speed, the environmental temperature and the temperature of the outside heat exchanger, and aims of ensuring complete defrosting and shortening the defrosting cycle are achieved, thereby achieving technical effects of increasing the defrosting efficiency, increasing comfort of the passengers, decreasing heat waste and lowering entire power consumption of the vehicle, and further solving the problem of incomplete defrosting due to changes in the environmental temperature or the driving speed while using the conventional defrosting mode control method.

Figure 5:
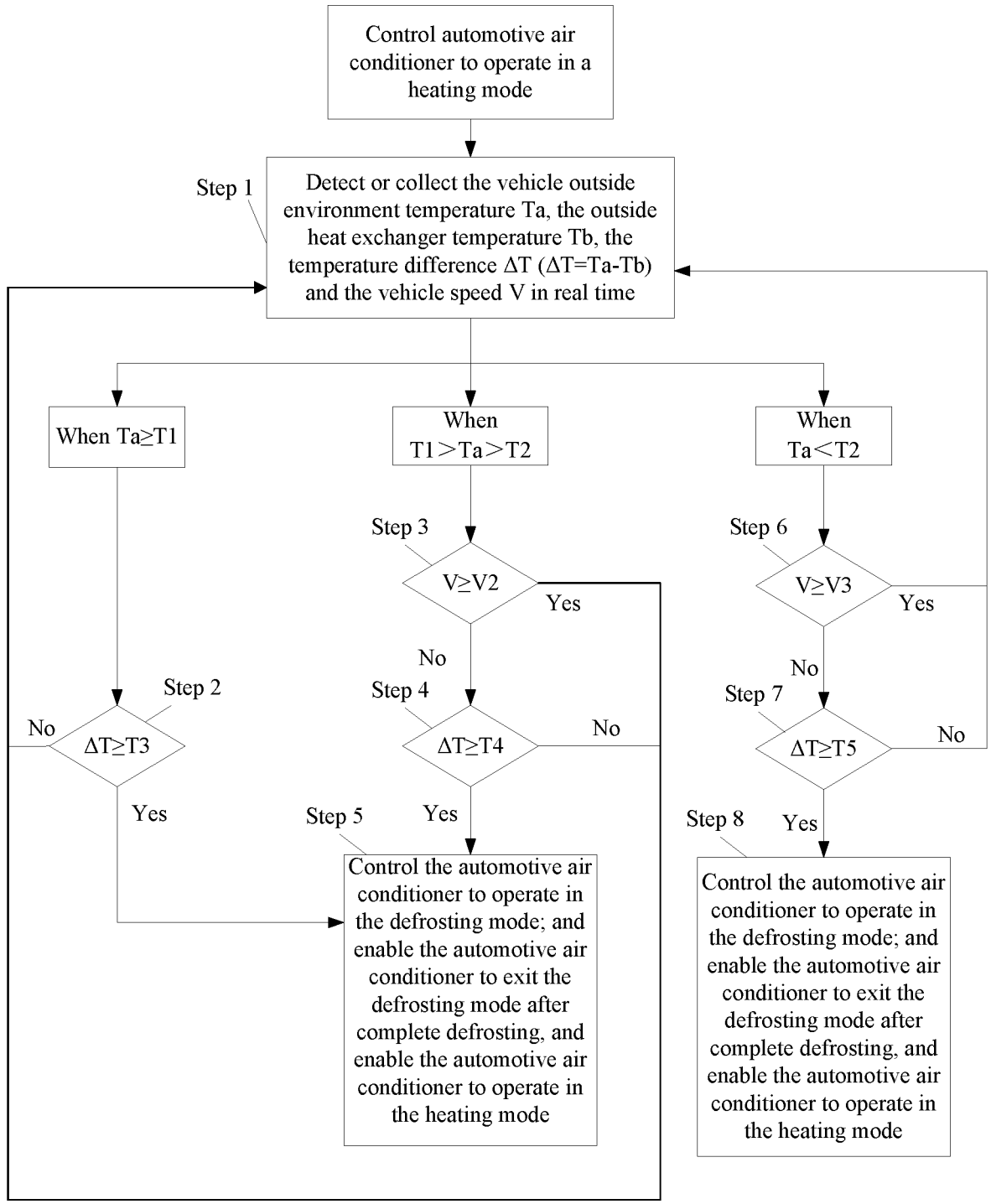
FIG. 5 is a flow diagram illustrating another optional air conditioner control method according to the embodiments of the present disclosure.

When the target object is an automobile, as shown in FIG. 5, the air conditioner control method in some embodiments are described below:

After an automotive air conditioner operates in a heating mode, enter a step 1.

Step 1: a vehicle outside environment temperature Ta, an outside heat exchanger temperature Tb, a temperature difference $\Delta T$ ($\Delta T=Ta-Tb$) and a vehicle speed V are detected or collected by an automotive air conditioning unit in real time; a step 2 is entered when the vehicle outside environment temperature Ta is greater than or equal to a preset temperature value T1; a step 3 is entered when the vehicle outside environment temperature Ta is greater than or equal to a preset temperature value T2 and less than the preset temperature value T1; and a step 6 is entered when the vehicle outside environment temperature Ta is less than the preset temperature value T2;

Step 2: a state of the current temperature difference $\Delta T$ is judged; and a step 5 is entered when the $\Delta T$ is greater than or equal to a preset temperature value T3, otherwise the step 1 is returned to;

Step 3: a state of the current vehicle speed V is judged; and the step 1 is returned to when the vehicle speed V is greater than or equal to a preset speed value V2, otherwise a step 4 is entered;

Step 4: the state of the current temperature difference $\Delta T$ is judged; and a step 5 is entered when the $\Delta T$ is greater than or equal to a preset temperature value T4, otherwise the step 1 is returned to;

Step 5: the automotive air conditioner is controlled to operate in a defrosting mode; and the automotive air conditioner is enabled to exit the defrosting mode after complete defrosting, and the automotive air conditioner is enabled to operate in a heating mode;

Step 6: the state of the current vehicle speed V is judged; and the step 1 is returned to when the vehicle speed V is greater than or equal to a preset speed value V3, otherwise a step 7 is entered;

Step 7: the state of the current temperature difference $\Delta T$ is judged; and a step 8 is entered when the $\Delta T$ is greater than or equal to a preset temperature value T5, otherwise the step 1 is returned to; and Step 8: the automotive air conditioner is controlled to operate in the defrosting mode; and the automotive air conditioner is enabled to exit the defrosting mode after complete defrosting, and the automotive air conditioner is enabled to operate in the heating mode.

Parameters in the above logical control flows are specified as follows:

According to the defrosting effect of the heat pump car air conditioner under different environmental temperature conditions obtained by experiments, the preset temperature value T1 is greater than or equal to 0° C., in some embodiments, the T1 is equal to 0° C.; and the preset temperature value T2 is less than and equal to −3° C., in some embodiments, the T2 is equal to −5° C.

Preset temperature values T3, T4 and T5 are important reference values of judging whether the outside heat exchanger temperature Tb enters the defrosting mode condition under different environmental temperature conditions. The preset temperature values T3, T4 and T5 may be constants, in some embodiments, T3=−8° C., T4=−12° C. and T5=−18° C. The preset temperature values T3, T4 and T5 may also be different variable values along with the vehicle outside environment temperature Ta, in some embodiments, T3=(Ta−8), T4=(Ta−10) and T5=(Ta−12). The preset temperature values T3, T4 and T5 may be respectively set as constant values according to different requirements or may be different variable values along with the vehicle outside environment temperature Ta.

The temperature difference $\Delta T$=the vehicle outside environment temperature Ta−the outside heat exchanger temperature Tb.

According to the defrosting effect of the heat pump car air conditioner under different vehicle speed conditions obtained by experiments, a preset speed value V2 is less than and equal to 40 km/h, in some embodiments, the V2 is equal to 20 km/h; and a preset speed value V3 is less than and equal to 20 km/h, in some embodiments, the V3 is equal to 10 km/h.

Figure 1:
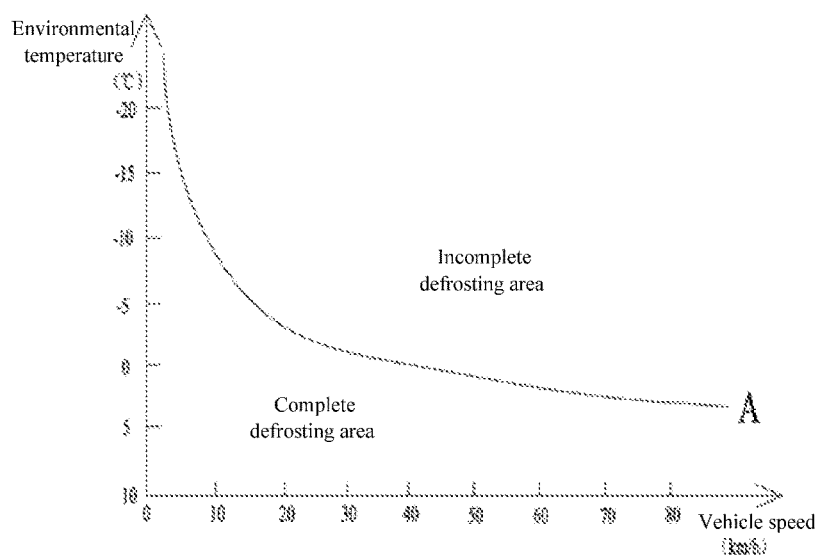
FIG. 1 is a schematic diagram known to the inventors illustrating a defrosting effect of a heat pump car air conditioner at different environmental temperatures and speeds.

By setting the preset temperature values T1, T2, T3, T4 and T5 and the preset speed values V2 and V3 in the above logical control flows, the heat pump air conditioner system can be controlled to enter the defrosting mode in a complete defrosting area below a curve A as shown in FIG. 1 as much as possible. Thus, incomplete defrosting is avoided; heat waste is decreased; the power consumption of the electric vehicles is lowered; the defrosting cycle is shortened; and comfort of passengers is increased.

Figure 6:
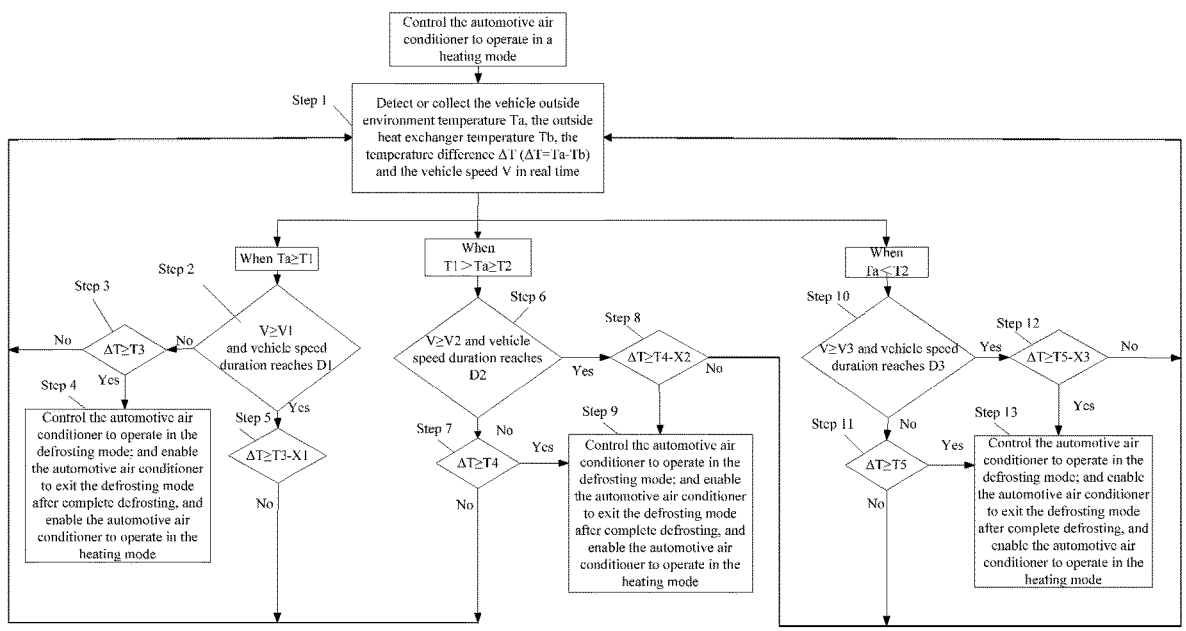
FIG. 6 is a flow diagram illustrating another optional air conditioner control method according to the embodiments of the present disclosure.

When the target object is still the automobile, as shown in FIG. 6, the air conditioner control method in some embodiments are described below:

Incomplete defrosting is easily caused by the reasons that the vehicle is located in severe conditions for a long time that the driving speed is high and the vehicle outside environment temperature is lower. Therefore, in the logical control flow of the present alternative embodiments, conditions of entering the defrosting mode at a higher vehicle speed are corrected.

Corrected values X1/X2/X3 of corresponding temperature values $\Delta T$ are different under different vehicle outside environment temperatures Ta and vehicle speeds V. To judge a driving state of the vehicle, duration detection of the automotive air conditioner control system reaching preset vehicle speed values V1/V2/V3 of the vehicle speed V is increased. The driving speed state of the vehicle is judged to be stable for a long time if the detected duration exceeds preset time values D1/D2/D3.

As shown in FIG. 4, specific logical control flows of the control method are as follows:

After the automotive air conditioner operates in a heating mode, enter a step 1.

Step 1: the vehicle outside environment temperature Ta, the outside heat exchanger temperature Tb, the vehicle speed V, the temperature difference $\Delta T$ ($\Delta T$=Ta−Tb) are detected or collected by an automotive air conditioning unit in real time; a step 2 is entered when the vehicle outside environment temperature Ta is greater than or equal to a preset temperature value T1; a step 6 is entered when the vehicle outside environment temperature Ta is greater than or equal to a preset temperature value T2 and less than the preset temperature value T1; and a step 10 is entered when the vehicle outside environment temperature Ta is less than the preset temperature value T2;

Step 2: a state of the current vehicle speed V and vehicle speed duration is judged; and a step 5 is entered if the vehicle speed V is greater than or equal to a preset speed value V1 and the vehicle speed duration reaches a preset time value D1, otherwise a step 3 is entered;

Step 3: a state of the current temperature difference $\Delta T$ is judged; and a step 4 is entered when the $\Delta T$ is greater than or equal to a preset temperature value T3, otherwise the step 1 is returned to;

Step 4: the automotive air conditioner is controlled to operate in a defrosting mode; and the automotive air conditioner is enabled to exit the defrosting mode after complete defrosting, and the automotive air conditioner is enabled to operate in the heating mode;

Step 5: a state of the current temperature difference $\Delta T$ is judged; and a step 4 is entered when the $\Delta T$ is greater than or equal to (the preset temperature value T3−a corrected value X1), otherwise the step 1 is returned;

Step 6: a state of the current vehicle speed V and vehicle speed duration is judged; and a step 7 is entered if the vehicle speed V is greater than or equal to a preset speed value V2 and the vehicle speed duration reaches a preset time value D2, otherwise a step 8 is entered;

Step 7: the state of the current temperature difference $\Delta T$ is judged; and a step 9 is entered when the $\Delta T$ is greater than or equal to a preset temperature value T4, otherwise the step 1 is returned to;

Step 8: the state of the current temperature difference $\Delta T$ is judged; and a step 9 is entered when the $\Delta T$ is greater than or equal to (the preset temperature value T4−a corrected value X2), otherwise the step 1 is returned to;

Step 9: the automotive air conditioner is controlled to operate in the defrosting mode; and the automotive air conditioner is enabled to exit the defrosting mode after complete defrosting, and the automotive air conditioner is enabled to operate in the heating mode;

Step 10: a state of the current vehicle speed V and vehicle speed duration is judged; and a step 12 is entered if the vehicle speed V is greater than or equal to a preset speed value V3 and the vehicle speed duration reaches a preset time value D3, otherwise a step 11 is entered;

Step 11: the state of the current temperature difference $\Delta T$ is judged; and a step 13 is entered when the $\Delta T$ is greater than or equal to a preset temperature value T5, otherwise the step 1 is returned to;

Step 12: the state of the current temperature difference $\Delta T$ is judged; and a step 13 is entered when the $\Delta T$ is greater than or equal to (the preset temperature value T5−a corrected value X3), otherwise the step 1 is returned to; and Step 13: the automotive air conditioner is controlled to operate in the defrosting mode; and the automotive air conditioner is enabled to exit the defrosting mode after complete defrosting, and the automotive air conditioner is enabled to operate in the heating mode.

The parameters in the above logical control flows are specified as follows:

According to the defrosting effect of the heat pump car air conditioner under different environmental temperature conditions obtained by experiments, the preset temperature value T1 is greater than or equal to 0° C., in some embodiments, the T1 is equal to 0° C.; and the preset temperature value T2 is less than and equal to −3° C., in some embodiments, the T2 is equal to −5° C.

Preset temperature values T3, T4 and T5 are important reference values of judging whether the outside heat exchanger temperature Tb enters a defrosting mode condition under different environmental temperature conditions. The preset temperature values T3, T4 and T5 may be constants, in some embodiments, T3=−8° C., T4=−12° C. and T5=−18° C. The preset temperature values T3, T4 and T5 may also be different variable values along with the vehicle outside environment temperature Ta, in some embodiments, T3=(Ta−8), T4=(Ta−10) and T5=(Ta−12). The preset temperature values T3, T4 and T5 may be respectively set as constant values according to different requirements or may be different variable values along with the vehicle outside environment temperature Ta.

The temperature difference ΔT=the vehicle outside environment temperature Ta−the outside heat exchanger temperature Tb. The vehicle driving state is judged according to different vehicle outside environment temperatures Ta and vehicle speeds V and according to the vehicle speed duration; and the temperature difference ΔT is corrected. In some embodiments, the corrected value X1 is 2° C.; the corrected value X2 is 3° C.; and the corrected value X3 is 4° C.

According to the defrosting effect of the heat pump car air conditioner under different vehicle speed conditions obtained by experiments, a preset speed value V1 is greater than or equal to 40 km/h, in some embodiments, the V1 is equal to 80 km/h; a preset speed value V2 is less than and equal to 40 km/h, in some embodiments, the V2 is equal to 20 km/h; and a preset speed value V3 is less than and equal to 20 km/h, in some embodiments, the V3 is equal to 10 km/h.

In some embodiments, the preset time value D1 of the vehicle speed is 300 seconds; the preset time value D2 is 180 seconds; and the preset time value D3 is 120 seconds.

By setting the preset temperature values T1, T2, T3, T4 and T5, the preset speed values V1, V2 and V3, the preset time values D1, D2 and D3 and the corrected values X1, X2 and X3, the heat pump air conditioner system may be controlled to enter the defrosting mode in a complete defrosting area below a curve A as shown in FIG. 1 as much as possible. Thus, incomplete defrosting is avoided; heat waste is decreased; the power consumption of the electric vehicles is lowered; the defrosting efficiency is increased; and comfort of the passengers is increased. When the vehicle is located in the conditions for a long time that the driving speed is very high and the vehicle outside environment temperature is lower, the temperature difference ΔT at which the air conditioner enters the defrosting mode is corrected, thereby ensuring complete defrosting.

According to the air conditioner control method in some embodiments, the heat pump air conditioner system is controlled by integrated utilization of the parameters such as the actual driving speed of the vehicle, the vehicle outside environment temperature and the temperature of the outside heat exchanger, and effects of increasing the defrosting efficiency, ensuring complete defrosting, shortening the defrosting cycle, increasing comfort of the passengers, decreasing heat waste and lowering entire power consumption of the vehicle may be achieved. Normally, by detecting the actual driving speed of the vehicle and the vehicle outside environment temperature, the heat pump air conditioner is controlled to avoid from entering the defrosting mode in the upper area of the curve A under a severe defrosting condition, thereby increasing the defrosting efficiency, ensuring complete defrosting, decreasing heat waste, lowering the power consumption of the electric vehicle and increasing the comfort of the passengers. When the vehicle is located in the conditions for a long time that the driving speed is very high and the vehicle outside environment temperature is lower, the conditions under which the air conditioner enters the defrosting mode are corrected according to different temperatures and vehicle speeds, thereby ensuring complete defrosting and avoiding a phenomenon that the frost is increasingly thick due to incomplete defrosting.

The above embodiments of the present disclosure are merely for description, rather than a representation of advantages and disadvantages of the embodiments.

In the above embodiments of the present disclosure, the description of each embodiment has a focus. One part that is not described in detail in a certain embodiment may refer to related description of other embodiments.

It should be understood that, in several embodiments provided by the present disclosure, the disclosed technical contents may be realized in other ways. The embodiments of the above described device are merely illustrative. For example, division of units may be a logical function division. Another division way may exist during actual implementation, i.e., multiple units or components may be combined or integrated into another system, or some features may be neglected, or not executed. In addition, displayed or discussed mutual coupling or direct coupling or communication connection may be indirect coupling or communication connection by virtue of some interfaces, units or modules, and may also be electrical or in other forms.

The described units serving as detachable components may be or may not be physically detached. Components displayed as units may be or may not be physical units, i.e., the components may be located in one place or may also be distributed onto multiple units. The purposes of the solutions in some embodiments may be realized by selecting partial or total units according to actual needs.

In addition, various functional units in each embodiment of the present disclosure may be integrated in one processing unit, or each unit may physically exist alone, or two or more than two units are integrated in one unit. The above integrated units may be realized in the form of hardware, or may be realized in the form of a software function unit.

When realized in the form of the software function unit and sold or used serving as independent products, the integrated units may be stored in one computer readable storage medium. Based on such an understanding, the substantial technical solutions of the present disclosure or one part making a contribution to the prior art or the total or partial technical solutions may be manifested in the form of software products. The computer software products are stored in one storage medium, including multiple instructions. Thus, the total or partial steps of the method in each embodiment of the present disclosure are executed by computer equipment (i.e., a personal computer, a server or a network device and the like). The above storage medium includes a USB flash disk, a read-only memory (ROM), a random access memory (RAM), a mobile hard disk drive, a disk or an optical disc and other various media in which program codes are stored.

The above descriptions are merely preferred embodiments of the present disclosure. It should be indicated that, for those ordinary skilled in the art, various improvements and modifications can be made without departing from the principle of the present disclosure. These improvements and modifications may be considered as the scope of protection of the present disclosure.

What is claimed is:

1. An air conditioner control system, comprising:
an environmental temperature sensor, configured to detect a first temperature value of an external environment of a target object;
a heat exchanger temperature sensor, configured to detect a second temperature value of an outside heat exchanger of an air conditioner system;
a speed monitoring system, configured to detect a driving speed of the target object; and
a control system, connected to the environmental temperature sensor, the heat exchanger temperature sensor and the speed monitoring system, and configured to determine according to the first temperature value, the second temperature value and the driving speed, whether the air conditioner system enters a defrosting mode in a case that the air conditioner system operates in a heating mode,
wherein the control system comprises:
a comparator, configured to determine a preset temperature interval to which the first temperature value belongs;
a controller, configured to determine that the air conditioner system enters the defrosting mode based on the reset temperature interval to which the first temperature value belongs in a case that the second temperature value and the driving speed meet preset conditions,
wherein the preset temperature interval is separated into a first temperature interval, a second temperature interval and a third temperature interval; a temperature value of the first temperature interval is greater than a temperature value of the second temperature interval; and the temperature value of the second temperature interval is greater than a temperature value of the third temperature interval,
wherein in a case that the first temperature value belongs to the second temperature interval,
the comparator is further configured to determine whether the driving speed is less than a second speed threshold and whether a temperature difference of the first temperature value and the second temperature value is greater than or equal to a second preset temperature; and
the controller is configured to determine that the air conditioner system enters the defrosting mode if the driving speed is less than the second speed threshold and the temperature difference is greater than or equal to the second preset temperature.

2. The system as claimed in claim 1, wherein the heat exchanger temperature sensor is arranged between fins of the outside heat exchanger, or arranged on an inlet-outlet tube of the outside heat exchanger, or arranged on a surface of the outside heat exchanger.

3. The system as claimed in claim 1, wherein the environmental temperature sensor is arranged at a front end of the target object.

4. The system as claimed in claim 1, wherein in a case that the first temperature value belongs to the third temperature interval,
the comparator is further configured to determine whether the driving speed is less than a third speed threshold and whether a temperature difference of the first temperature value and the second temperature value is greater than or equal to a third preset temperature; and
the controller is configured to determining that the air conditioner system enters the defrosting mode if the driving speed is less than the third speed threshold and the temperature difference is greater than or equal to the third preset temperature.

5. The system as claimed in claim 1, wherein in a case that the first temperature value belongs to the first temperature interval,
the comparator is further configured to determine whether the driving speed is greater than or equal to a first speed threshold;
the control system further comprises:
a timer, configured to determine whether a duration in which the driving speed is greater than or equal to the first speed threshold, reaches a first time threshold;
the comparator, configured to determine whether a temperature difference of the first temperature value and the second temperature value is greater than or equal to a difference of a first temperature threshold and a first corrected value if the driving speed is greater than or equal to the first speed threshold and the duration reaches the first time threshold; and
the controller, configured to determine that the air conditioner system enters the defrosting mode if the temperature difference of the first temperature value and the second temperature value is greater than or equal to the difference of the first temperature threshold and the first corrected value.

6. The system as claimed in claim 5, wherein
the comparator is further configured to determine whether the temperature difference of the first temperature value and the second temperature value is greater than or equal to the first temperature threshold if the driving speed is less than the first speed threshold or the duration does not reach the first time threshold; and
the controller is configured to determine that the air conditioner system enters the defrosting mode if the temperature difference of the first temperature value and the second temperature value is greater than or equal to the first preset temperature.

7. The system as claimed in claim 1, wherein in a case that the first temperature value belongs to the second temperature interval,
the comparator is further configured to determine whether the driving speed is greater than or equal to a second speed threshold;
the control system further comprises:
a timer, configured to determine whether a duration in which the driving speed is greater than or equal to the second speed threshold reaches a second time threshold;
the comparator, configured to determine whether a temperature difference of the first temperature value and the second temperature value is greater than or equal to a difference of a second temperature threshold and a second corrected value if the driving speed is greater than or equal to the second speed threshold and the duration reaches the second time threshold; and
the controller, configured to determine that the air conditioner system enters the defrosting mode if the temperature difference of the first temperature value and the second temperature value is greater than or equal to the difference of the second temperature threshold and the second corrected value.

8. The system as claimed in claim 7, wherein the comparator is further configured to determine whether the temperature difference of the first temperature value and the second temperature value is greater than or equal to the second temperature threshold if the driving speed is less than the second speed threshold or the duration does not reach the second time threshold; and the controller is configured to determine that the air conditioner system enters the defrosting mode if the temperature difference of the first temperature value and the second temperature value is greater than or equal to the second temperature threshold.

9. The system as claimed in claim 1, wherein in a case that the first temperature value belongs to the third temperature interval, the comparator is further configured to determine whether the driving speed is greater than or equal to a third speed threshold;

the control system further comprises:

a timer, configured to determine whether a duration in which the driving speed is greater than or equal to the third speed threshold reaches a third time threshold;

the comparator, configured to determine whether a temperature difference of the first temperature value and the second temperature value is greater than or equal to a difference of a third temperature threshold and a third corrected value if the driving speed is greater than or equal to the third speed threshold and the duration reaches the third time threshold; and the controller, configured to determine that the air conditioner system enters the defrosting mode if the temperature difference of the first temperature value and the second temperature value is greater than or equal to the difference of the third temperature threshold and the third corrected value.

10. The system as claimed in claim 9, wherein the comparator is further configured to determine whether the temperature difference of the first temperature value and the second temperature value is greater than or equal to the third temperature threshold if the driving speed is less than the third speed threshold or the duration does not reach the third time threshold; and the controller is configured to determine that the air conditioner system enters the defrosting mode if the temperature difference of the first temperature value and the second temperature value is greater than or equal to the third temperature threshold.

11. The system as claimed in claim 1, wherein in a case that the first temperature value belongs to the first temperature interval, the comparator is further configured to determine whether a temperature difference of the first temperature value and the second temperature value is greater than or equal to a first preset temperature; and the controller is configured to determine that the air conditioner system enters a defrosting mode if the temperature difference of the first temperature value and the second temperature value is greater than or equal to the first preset temperature.

12. The system as claimed in claim 1, wherein the target object is an automobile.

13. An air conditioner control method, comprising:

acquiring a first temperature value of an external environment of a target object, a second temperature value of an outside heat exchanger of an air conditioner system and a driving speed of the target object; and determining according to the first temperature value, the second temperature value and the driving speed, whether the air conditioner system enters a defrosting mode in a case that the air conditioner system operates in a heating mode, wherein the step of determining whether the air conditioner system enters the defrosting mode according to the first temperature value, the second temperature value and the driving speed comprises:

determining a preset temperature interval to which the first temperature value belongs; and controlling the air conditioner system to enter the defrosting mode based on the preset temperature interval to which the first temperature value belongs in a case that the second temperature value and the driving speed meet preset conditions, wherein the reset temperature interval is separated into a first temperature interval a second temperature interval and a third temperature interval; a temperature value of the first temperature interval is greater than a temperature value of the second temperature interval; and the temperature value of the second temperature interval is greater than a temperature value of the third temperature interval, wherein based on the preset temperature interval to which the first temperature value belongs, in a case that the second temperature value and the driving speed meet preset conditions, the step of controlling the air conditioner system to enter the defrosting mode comprises:

in a case that the first temperature value belongs to the second temperature interval, determining whether the driving speed is less than a second speed threshold and whether a temperature difference of the first temperature value and the second temperature value is greater than or equal to a second preset temperature, and controlling the air conditioner system to enter the defrosting mode if the driving speed is less than the second speed threshold and the temperature difference of the first temperature value and the second temperature value is greater than or equal to the second preset temperature.

14. The method as claimed in claim 13, wherein based on the preset tepemperature interval to which the first temperature value belongs, in a case that the second temperature value and the driving speed meet preset conditions, the step of controlling the air conditioner system to enter the defrosting mode comprises:

in a case that the first temperature value belongs to the third temperature interval, determining whether the driving speed is less than a third speed threshold and whether a temperature difference of the first temperature value and the second temperature value is greater than or equal to a third preset temperature; and controlling the air conditioner system to enter the defrosting mode if the driving speed is less than the third speed threshold and the temperature difference of the first temperature value and the second temperature value is greater than or equal to the third preset temperature, or, wherein based on the preset temperature interval to which the first temperature value belongs, in a case that the second temperature value and the driving speed meet preset conditions, the step of controlling the air conditioner system to enter the defrosting mode comprises:

in a case that the first temperature value belongs to the third temperature interval, determining whether the driving speed is greater than or equal to a third speed threshold;

determining whether a duration in which the driving speed is greater than or equal to the third speed threshold reaches a third time threshold;

determining whether a temperature difference of the first temperature value and the second temperature value is greater than or equal to a difference of a third temperature threshold and a third corrected value if the driving speed is greater than or equal to the third speed threshold and the duration reaches the third time threshold; and controlling the air conditioner system to enter the defrosting mode if the temperature difference of the first temperature value and the second temperature value is greater than or equal to a difference of a third temperature threshold and a third corrected value, or, wherein based on the preset temperature interval to which the first temperature value belongs, in a case that the second temperature value and the driving speed meet preset conditions, the step of controlling the air conditioner system to enter the defrosting mode comprises:

in a case that the first temperature value belongs to the first temperature interval, determining whether a temperature difference of the first temperature value and the second temperature value is greater than or equal to a first preset temperature; and controlling the air conditioner system to enter the defrosting mode if the temperature difference of the first temperature value and the second temperature value is greater than or equal to the first preset temperature.

15. The method as claimed in claim 14, the method further comprising:

determining whether the temperature difference of the first temperature value and the second temperature value is greater than or equal to the third temperature threshold if the driving speed is less than the third speed threshold or the duration does not reach the third time threshold; and controlling the air conditioner system to enter the defrosting mode if the temperature difference of the first temperature value and the second temperature value is greater than or equal to the third temperature threshold.

16. A non-transitory storage medium, comprising stored programs, wherein the air conditioner control method of claim 13 is executed by the programs.

17. The method as claimed in claim 13, the method further comprising:

wherein based on the preset temperature interval to which the first temperature value belongs, in a case that the second temperature value and the driving speed meet preset conditions, the step of controlling the air conditioner system to enter the defrosting mode comprises:

in a case that the first temperature value belongs to the first temperature interval, determining whether the driving speed is greater than or equal to a first speed threshold;

determining whether a duration in which the driving speed is greater than or equal to the first speed threshold reaches a first time threshold;

determining whether a temperature difference of the first temperature value and the second temperature value is greater than or equal to a difference of a first temperature threshold and a first corrected value if the driving speed is greater than or equal to the first speed threshold and the duration reaches the first time threshold; and controlling the air conditioner system to enter the defrosting mode if the temperature difference of the first temperature value and the second temperature value is greater than or equal to the difference of the first temperature threshold and the first corrected value.

18. The method as claimed in claim 17, the method further comprising:

determining whether the temperature difference of the first temperature value and the second temperature value is greater than or equal to the first temperature threshold if the driving speed is less than the first speed threshold or the duration does not reach the first time threshold; and controlling the air conditioner system to enter the defrosting mode if the temperature difference of the first temperature value and the second temperature value is greater than or equal to the first temperature threshold.

19. The method as claimed in claim 13, wherein based on the preset temperature interval to which the first temperature value belongs, in a case that the second temperature value and the driving speed meet preset conditions, the step of controlling the air conditioner system to enter the defrosting mode comprises:

in a case that the first temperature value belongs to the second temperature interval, determining whether the driving speed is greater than or equal to a second speed threshold;

determining whether a duration in which the driving speed is greater than or equal to the second speed threshold reaches a second time threshold;

determining whether a temperature difference of the first temperature value and the second temperature value is greater than or equal to a difference of a second temperature threshold and a second corrected value if the driving speed is greater than or equal to the second speed threshold and the duration reaches the second time threshold; and controlling the air conditioner system to enter the defrosting mode if the temperature difference of the first temperature value and the second temperature value is greater than or equal to the difference of the second temperature threshold and the second corrected value.

20. The method as claimed in claim 19, the method further comprising:

determining whether the temperature difference of the first temperature value and the second temperature value is greater than or equal to the second temperature threshold if the driving speed is less than the second speed threshold or the duration does not reach the second time threshold; and controlling the air conditioner system to enter the defrosting mode if the temperature difference of the first temperature value and the second temperature value is greater than or equal to the second temperature threshold.

* * * * *